United States Patent [19]
Rutherford et al.

[11] Patent Number: 5,614,576
[45] Date of Patent: Mar. 25, 1997

[54] POLY(β-HYDROXYORGANOATE) PRESSURE SENSITIVE ADHESIVE COMPOSITIONS

[75] Inventors: Denise R. Rutherford, Oakdale; W. James Hammar, St. Paul; Gaddam N. Babu, Woodbury, all of Minn.

[73] Assignee: Minnesota Mining and Manufacturing Company, St. Paul, Minn.

[21] Appl. No.: 632,769

[22] Filed: Apr. 15, 1996

Related U.S. Application Data

[63] Continuation of Ser. No. 289,685, Aug. 12, 1994, abandoned.

[51] Int. Cl.$^6$ .......................... C08L 93/00; C08G 63/06
[52] U.S. Cl. ........................ 524/270; 524/272; 524/274; 522/6; 525/450; 528/361
[58] Field of Search .................. 524/270, 272, 524/274; 522/6; 525/450; 528/361

[56] References Cited

U.S. PATENT DOCUMENTS

| | | | |
|---|---|---|---|
| 4,267,313 | 5/1981 | Sannan et al. | 536/18 |
| 4,511,687 | 4/1985 | Nakanishi et al. | 524/270 |
| 4,554,324 | 11/1985 | Husman et al. | 525/301 |
| 4,804,691 | 2/1989 | English et al. | 523/118 |
| 4,841,962 | 6/1989 | Berg et al. | 128/156 |
| 4,888,413 | 12/1989 | Domb | 528/272 |
| 5,004,767 | 4/1991 | Krause et al. | 524/30 |
| 5,019,069 | 5/1991 | Klemp | 604/387 |
| 5,135,859 | 8/1992 | Witholt et al. | 435/135 |
| 5,169,889 | 12/1992 | Kauffman et al. | 524/270 |
| 5,216,043 | 6/1993 | Sipinen et al. | 523/126 |
| 5,245,023 | 9/1993 | Peoples et al. | 536/23.2 |
| 5,252,646 | 10/1993 | Iovine et al. | 324/270 |
| 5,290,910 | 3/1994 | Shiotani et al. | 528/361 |
| 5,444,113 | 8/1995 | Sinclair et al. | 528/361 |
| 5,498,692 | 3/1996 | Noda | 528/361 |

FOREIGN PATENT DOCUMENTS

| | | |
|---|---|---|
| 632890 | 12/1961 | Canada . |
| 0511916A1 | 11/1992 | European Pat. Off. . |
| 609713 | 8/1994 | European Pat. Off. ........... C09J 7/02 |
| 4213214C1 | 7/1993 | Germany . |
| 4315611A1 | 11/1994 | Germany . |
| 92/21708 | 10/1992 | WIPO . |

OTHER PUBLICATIONS

G.J.M. de Koning et al., "A biodegradable rubber by crosslinking poly(hydroxyalkanoate) from *Pseudomonas oleovorans*", *Polymer*, 35, 2090–2097 (1994).

C.G. Pitt, "Non–Microbial Degradation of Polyesters; Mechanisms and Modifications" in *Biodegradable Polymers and Plastics*; M. Vert et al., Eds.; Royal Society of Chemistry: Cambridge; pp. 7–17 (1992).

*Encyclopedia of Polymer Science & Engineering*, 2nd Edition; John Wiley & Sons: New York; vol. 14, pp. 438–443 (1987).

G. J. Edgington et al., "Compostable Hot Melt Adhesives: An Update", H. B. Fuller Company, Insight International Conferences '93, Section VIII, 1–6.

G. Eggink et al., "Poly (3–hydorxyalkanoate) synthesis by *Pseudomonas* " Proceedings of the American Chem. Soc (fall meeting); *Polymeric Materials Science and Engineering*, 67, 130 (1992).

"Standard Test Methods for Peel Adhesion of Pressure–Sensitive Tape at 180–Deg Angle", ASTM Designation: D330–76, 655–658, (1977).

J. C. Vizzini et al, "Effect of Polarity of the Medium on the Stereospecific Polymerization of Propylene by *ansa*–Zirconocene Catalyst", *J. of Polym. Sci. Part A: Polym. Chem.*, 32, 2049–2056 (1994).

G. Ceccorulli et al., "Plasticization of Bacterial Poly(3–hydroxybutyrate)", *Macromolecules*, 25, 3304–3306 (1992).

Y. Poirier et al., "Progress Toward Biologically Produced Biodegradable Thermoplastics", *Adv. Mater.*, 5, 30–37 (1993).

(List continued on next page.)

*Primary Examiner*—Tae Yoon
*Attorney, Agent, or Firm*—Gary L. Griswold; Walter N. Kirn; Robert H. Jordan

[57] ABSTRACT

The present invention provides pressure sensitive adhesives, compositions from which the pressure sensitive adhesives are formed, and articles having therein these pressure sensitive adhesives. The pressure sensitive adhesives, which have a Tg of less than about 20° C., include a poly(β-hydroxyorganoate) or mixture thereof. Preferably, these poly(β-hydroxyorganoate)s include monomeric units of the general formula:

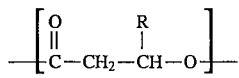

wherein: a minor amount (preferably no greater than about 20 mole percent) of the monomeric units have an R group containing 1–3 carbon atoms; and a major amount (preferably at least about 80 mole percent) of the monomeric units have an R group containing 4–30 (preferably 4–20) carbon atoms.

29 Claims, 4 Drawing Sheets

OTHER PUBLICATIONS

Y. B. Kim, "Preparation, Characterization, and Modification of Poly–Beta–Hydroxyalkanoates from Pseudomonas Oleovorans", Ph.D. Thesis, University of Massachusetts, May 1991.

T. L. Bluhm et al., "Isodimorphism in Bacterial Poly($\beta$–hydroxybutyrate–co–$\beta$–hydroxyvalerate)", *Macromolecules*, 19, 2871–2876, (1986).

H. Brandl et al., "*Pseudomonas oleovorans* as a Source of Poly ($\beta$–Hydroxyalkanoates) for Potential Applications as Biodegradable Polyesters", *Appl. Environ. Microbiol.*, 54, 1977–1982 (Aug. 1988).

K. Fritzsche et al., "An Unusual Bacterial Polyester With A Phenyl Pendant Group", *Makromol. Chem.*, 191, 1957–1965 (1990).

K. Fritzsche et al., "Production of Unsaturated Polyesters by *Pseudomonas Oleovorans*", *Int. J. Biol. Macromol.*, 12, 85–91 (1990).

R. A. Gross et al., "Biosynthesis and Characterization of Poly ($\beta$–hydroxyalkanoates) Produced by *Pseudomonas oleovorans*", *Macrommolecules*, 22, 1106–1115 (1989).

B. Hazer et al., "Biosynthesis of Mehtyl–Branched Poly ($\beta$–Hydroxyalkanoate)s by *Pseudomonas oleovorans*", *Macromolecules*, 27, 45–49 (1994).

R. W. Lenz et al., "Production of Unusual Bacterial Polyesters by *Pseudomonas olevorans* Through Cometabolism", *FEMS Microbiology Reviews*, 103, 207–214 (1992).

R. Peres et al., "Synthesis, Characterization and Crystallization Behaviour of Stereoregular Poly–$\beta$–hydroxyoctanoate", *Polymer*, 35, 1059–1067 (1994).

A. Steinbuechel, "Polyhydroxyfettsäuren—thermoplastisch verformbare Polyester aus Bakterien", *Naebr. Chem. Tech. Lab.*, 39, 1112–1124 (1991). (English language abstract attached—Chem. Abs. 116: 192494x).

POLY(β-HYDROXYORGANOATE) PRESSURE SENSITIVE ADHESIVE COMPOSITIONS

This is a continuation of application Ser. No. 08/289,685, filed Aug. 12, 1994, now abandoned.

FIELD OF THE INVENTION

The invention relates to pressure-sensitive adhesive compositions containing poly(β-hydroxyorganoate)s.

BACKGROUND OF THE INVENTION

Tacky pressure-sensitive adhesive ("PSA") compositions suitable for use in adhesive tapes, for example, must have a requisite four-fold balance of adhesion, cohesion, stretchiness, and elasticity, an open time tack (i.e., period of time during which the adhesive is tacky at room temperature) on the order of days and often months or years, and a glass transition temperature (Tg) of less than about 20° C. PSA-coated tapes have been produced for at least 50 years, however, early PSA-coated tapes did not have very desirable characteristics. Early PSA tapes were merely expected to temporarily adhere to a surface upon which they were adhered. Adhesive failure, discoloration, and cohesive failure were tolerated. Today, PSAs are expected to possess this extremely delicate balance of properties known in the trade as the "four-fold" balance of adhesion, cohesion, stretchiness, and elasticity. Some PSA compositions also have desirable transparency and resistance to aging, even upon exposure to severe weathering conditions.

Pressure sensitive adhesives have historically been based on petroleum-derived polymers such as poly(ethylene), poly(propylene), ethylene-vinyl acetate copolymers, and styrene block copolymers, for example. These compositions are typically further tackified, plasticized, and reinforced with a variety of resins, oils, and waxes, which are derived from both petroleum and naturally occurring feedstocks such as wood, gum, terpenes, etc. For example, early PSA compositions consisted of natural crude rubber tackified by esterfied wood rosin. However, these PSAs had poor aging properties, e.g., poor oxidative stability. These compositions were improved by the introduction of synthetic acrylic ester polymers, which were inherently tacky and possessed the elasticity and compliance required for the four-fold balance of properties. As the need arose, improvements were made in the basic acrylic ester PSA to meet the needs in the marketplace. Transparency and resistance to oxidation inherent in acrylic ester PSAs made them outstanding candidates for the most demanding PSA tape applications.

Environmental factors are becoming increasingly important in products marketed to consumers such as PSA containing diaper tapes, packaging tapes, medical tapes, surgical drapes, and the like. Two very important environmental factors are the mode of production and the mode of disposal of such products. For example, during manufacture, it is important to use solvent-free processing. Additionally, with the trend toward environmentally degradable materials, a PSA that could be disposed in an environmentally sound manner (e.g., in a municipal solid waste compost site) would be an important feature. The classic composition of PSAs are generally resistant to degradation upon disposal in such an environment. In addition to resisting degradation themselves, classic PSA materials can inhibit the degradation of the substrates on which they are coated. Thus, what is needed are PSAs, i.e., adhesives having the four-fold balance of properties described above, composed of biodegradable polymers.

Although hot melt adhesives, and even "pressure sensitive hot melt adhesives" (which are to be adhesives having a finite open time and lacking the four-fold balance of PSAs) composed of biodegradable polymers have been reported, little has been done in the area of biodegradable pressure sensitive adhesives. See, for example, U.S. Pat. Nos. 5,169,889 (Kauffman et al.) and 5,252,646 (Iovine et al.), which describe hot melt adhesives, varying from pressure sensitive to nonpressure sensitive in character, containing either poly(lactide) homoor copolymers or a linear polyester of 3-hydroxybutyric (HB) and 3-hydroxyvaleric acids (HV). The copolyesters, P(HB-co-HV), are statistically random and of high crystallinity (>60%) throughout a range of compositions varying from 0 to 47 mol–% HV. See, for example, R. A. Gross et al., *Macromolecules*, 22, 1106–1115 (1989).

SUMMARY OF THE INVENTION

The present invention stems from the growing movement towards products that have demonstrated some level of biodegradation. The present invention utilizes a class of naturally occurring, thermoplastic, biodegradable polymers. These biodegradable polymers are generally compostable, i.e., capable of undergoing substantial conversion by microorganisms under aerobic conditions to carbon dioxide, water, and biomass. It is believed that at least some of these polymers are also degradable under anaerobic conditions.

This class of polymers encompasses poly(hydroxyorganoate)s, i.e., poly(β-hydroxyorganoate)s, which possess thermal and oxidative stability, and chemical resistance. They are generally nontoxic and safe in use and upon disposal. They also possess a wide range of adhesive properties, particularly when formulated with an appropriate tackifier. These properties make suitable for use in pressure sensitive adhesives for a wide range of applications where it is desirable to have independent control of peel and shear adhesion, and where the ultimate disposal of the adhesive will be into a biologically active environment where biodegradation will be allowed to occur. Compositions with improved PSA properties may be made by blending two or more such polymers or by crosslinking.

The present invention provides pressure sensitive adhesives, compositions from which the pressure sensitive adhesives are formed, and articles having a substrate with at least one surface on which is coated these pressure sensitive adhesives. The pressure sensitive adhesives, which have a Tg of less than about 20° C., include a poly(β-hydroxyorganoate) or mixture thereof. Preferably, these poly(β-hydroxyorganoate)s include monomeric units of the general formula:

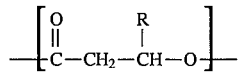

wherein: a minor amount (preferably no greater than about 20 mole percent) of the monomeric units have an R group containing 1–3 carbon atoms; and a major amount (preferably at least about 80 mole percent) of the monomeric units have an R group, i.e., side chain, containing 4–30 (preferably 4–20) carbon atoms. Particularly preferred embodiments include a poly(β-hydroxyorganoate) having a major amount of at least two different monomeric units with R groups containing 4–30 carbon atoms. The adhesive compositions of the invention can be applied to a variety of substrates by a wide range of processes, i.e., solution coating, solution spraying, thermal extrusion, emulsion coating, etc., to make adhesive articles, e.g., tapes, adhesive transfer films, surgical drapes, and the like.

As used in this invention:

"polymer" means a homopolymer or a copolymer (i.e., a polymer containing two or more dissimilar, i.e., different, monomers), which includes a terpolymer, a tetrapolymer, and the like; copolymers derived from more than one type of monomer may be either random or block copolymers;

"tackifier" means a low molecular weight (typically having a molecular weight of less than 2000 g/mol.), high glass transition temperature (Tg) resin (typically having a Tg of greater than 50° C.) used to control the adhesive tack of a polymer;

"crosslinking agent" means a compound that either initiates a crosslinking process or connects polymer chains and becomes incorporated therein; this increases the molecular weight of the adhesive and thus its cohesive strength without unduly affecting its compliance or other PSA properties; this encompasses thermally or radiation activated crosslinkers, photoinitiators, sensitizers, ect.

"chemical crosslinker" means a compound which, under the influence of heat or light, connects polymer chains and becomes incorporated therein;

"radiation crosslinker" or "radiation active (or activated) crosslinker" means a compound which, under the influence of radiation, connects polymer chains and becomes incorporated therein;

"sensitizer" means a material that absorbs energy and transfers energy to a different material in an activation process;

"photoinitiator" means a material that has the ability to produce radicals upon exposure to light; and "thermal initiator" means a material that has the ability to produce radicals upon exposure to heat.

As these crosslinking agents are defined, it should be apparent that some of the categories overlap such that certain compounds can be classified in more than one category. Thus, a thermal initiator could also be a chemical crosslinker, for example.

DETAILED DESCRIPTION

Figure 1:
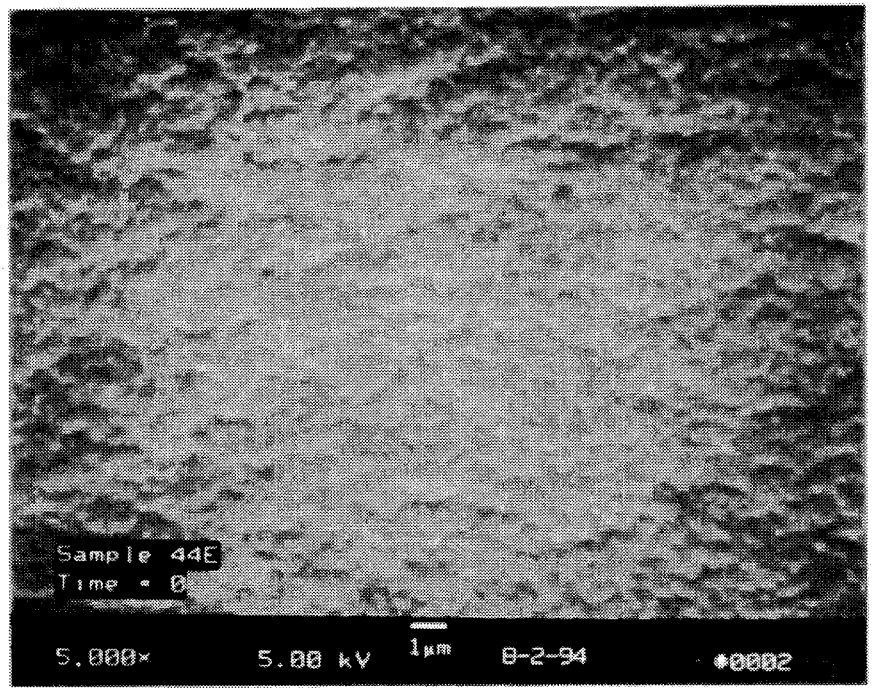
FIG. 1 is a Scanning Electron Micrograph of the adhesive of Example 38 as cast from solution.

The present invention provides tacky PSA compositions and adhesive coated materials having the requisite four-fold balance of adhesion, cohesion, stretchiness, and elasticity, open time on the order of days, and a Tg of less than about 20° C. The adhesive compositions also have good peel strength and tack properties plus excellent shear strength and creep resistance, as well as excellent processability, with or without solvent. Generally, the adhesive compositions of the present invention also have optical clarity. The compositions of the present invention are generally resistant to oxidative and photochemical degradation for the anticipated use life of the PSA, although they will undergo degradation upon exposure to biologically active environments.

The PSA compositions of the present invention preferably have a peel adhesion of at least about 1.0N/dm, preferably at least about 10N/dm. Thus, the PSA compositions of the present invention can be repositionable pressure sensitive adhesives. More preferably, the PSA compositions of the present invention also have a static shear of at least about 1 minute (preferably at least about 10 minutes, and more preferably at least about 25 minutes). They also have an open time at room temperature (i.e., 20°–30° C.), i.e., period of time during which the adhesive remains tacky, of at least about 7 days, preferably at least about 20 days, more preferably at least about 30 days, most preferably at least about 6 months. Particularly preferred PSA compositions have an opent time of at least about 1 year.

The PSA compositions of the present invention include a poly(β-hydroxyorganoate), i.e., poly(hydroxyorganoate) or poly(3-hydroxyorganoate), or a mixture of various types of such polymers. Poly(β-hydroxyorganoate)s are a class of β-monoalkyl-substituted-poly-β-esters that are naturally occurring in a wide variety of bacterial microorganisms. These polyesters function as intracellular carbon and energy storage materials. They are biodegradable polymers.

Various bacteria, e.g., *Pseudomonas oleovorans, Pseudomonas putida, Pseudomonas aeruginosa, Alcaligenes eutrophus , Rhodospirillum rubrum, Bacillus megaterium* are capable of metabolizing alkanes, alkanols, alkanoic acids, alkenes, alkenols, alkenoic acids, and esters, for example, to poly(β-hydroxyorganoate)s when grown under nutrient-limiting conditions. For example, when *P. oleovorans* is grown under nitrogen-limiting conditions on the substrates hexane through dodecane, poly(β-hydroxyorganoate)s are formed which, depending on the growth substrate used, contain variable amounts of the monomer units. In fact, *P. oleovorans* is capable of producing very unusual poly(β-hydroxyorganoate)s, such as those containing relatively long n-alkyl pendant groups. By using combinations of feedstocks, e.g., a combination of octane and nonane or octanoic and nonanoic acids, copolymers can be obtained, e.g., copolymers of β-hydroxyoctanoates and β-hydroxynonanoates. Poly(β-hydroxyorganoate)s having unsaturated pendant groups have also been produced, for example, from *P. oleovorans* grown with 1-alkenes, 3-hydroxyalkenoic acids, or alkenoic acids.

The PSA compositions of the present invention preferably include a poly(β-hydroxyorganoate) in an amount of at least about 20 weight percent (wt-%), more preferably in an amount of at least about 30 wt-%. Although the compositions of the present invention could include 100 wt-% of a poly(β-hydroxyorganoate), preferably there is no greater than about 97 wt-% of the a poly(β-hydroxyorganoate). Particularly preferred PSA compositions of the present invention include about 40–70 wt-% poly(β-hydroxyorganoate).

Suitable poly(β-hydroxyorganoate)s for use in the present invention are biodegradable, have a Tg of less than about 10° C., preferably less than about 0° C., and more preferably less than about −5° C., and are soluble in common organic solvents. The pressure sensitive adhesives incorporating these polymers have a Tg of less than about 20° C., preferably less than about 5° C., and more preferably less than about −5° C. Prior to any crosslinking, suitable poly(β-hydroxyorganoate)s have a molecular weight (weight average) of at least about 30,000, preferably at least about 50,000, and more preferably at least about 100,000. They typically have a molecular weight of less than about 2 million.

These polymers include monomeric units of the general formula:

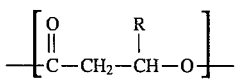

wherein R is an organic group, i.e., aliphatic, alicyclic, or aromatic group, containing 1–30 carbon atoms (preferably 1–20 carbon atoms), which can be saturated or unsaturated, branched or straight chain group, substituted or unsubstituted. The R group can be substituted, i.e., functionalized, with Br, Cl, or COOH groups, for example.

The polymers useful in the PSA compositions of the present invention can include more than one type of repeat unit, i.e., monomeric unit, wherein R can vary from monomer unit to monomer unit within any one polymer. Thus, any one polymer can include a mixture of monomeric units, wherein the side chain, i.e., R group, contains anywhere from one carbon to thirty carbons.

Polymers with good pressure sensitive properties, e.g., little crystallization, can tolerate up to a total of about 20 mole-% of monomeric units having 1–3 carbon atoms in the side chain. The remainder of the monomeric units have 4–30 (preferably 4–20, and more preferably 4–15) carbon atoms in the side chain. Thus, typical polymers useful in the PSA compositions of the present invention can have a total of up to 20 mole-% monomeric units wherein R is a $C_1$, $C_2$, or $C_3$ group, or mixtures thereof, and at least about 80 mole-% monomeric units wherein R is a $C_4$, $C_5$, $C_6$, $C_7$ ... $C_{27}$ group, or mixtures thereof. Polymers that contain more than about 20 mole-% monomeric units wherein R is a $C_{1-3}$ group are generally unacceptable pressure sensitive adhesives because such groups tend to crystallize with time. Thus, the polymers of the present invention can be homopolymers, copolymers, terpolymers, tetrapolymers, etc. There is generally no limit to the number of different types of repeat units in any one polymer.

Examples of poly(β-hydroxyorganoate)s produced by bacteria that are useful for the preparation of poly(β-hydroxyorganoate)s include: poly(3-hydoxyheptanoate)(R= butyl); poly(3-hydroxy-5-methylhexanoate)(R=i-butyl); poly(3-hydroxyoctanoate) (R=pentyl); poly(3-hydroxynonanoate) (R=hexyl); poly(3-hydroxydecanoate) (R=heptyl); poly(3-hydroxyundecanoate) (R=octyl); poly(3-hydroxydodecanoate) (R=nonyl); poly(3-hydroxy-7-octenoate) (R=4-pentenyl); poly(3-hydroxy-6-heptenoate) (R=3-butenyl); poly(3-hydroxy-8-nonenoate)(R=5-hexenyl); poly(3-hydroxyoctanoate-co-3-hydroxynonanoate) (R=pentyl and hexyl, respectively);poly(3-hydroxyoctanoate-co-hydroxyundecanoate) (R=pentyl and octyl, respectively); poly(3-hydroxy-8-bromooctanoate) (R=5-bromopentyl); poly(3-hydroxy-11-bromoundecanoate) (R=8-bromooctyl); poly(3-hydroxy-6-bromoheptanoate) (R=4-bromobutyl); poly(3-hydroxy-5-phenylvalerate) (R=2-phenylethyl); poly(3-hydroxyoctanoate-co-3-hydroxy- 10-undecenoate)(R=pentyl and 7-octenyl, respectively); poly(3-hydroxynonanoate-co-3-hydroxyoctadecanoate) (R=hexyl and pentadecyl, respectively); poly(3-nonanoate-co-3-hydroxy-9-octadecenoate) (R=hexyl and 6-pentadecenyl, respectively); and poly(3-hydroxy-3-phenylbutanoate) (R=benzyl). Each of these polymers is identified by its major repeat unit. That is, although each of these polymers contains a number of different repeat units, such that they are copolymers, terpolymers, etc., they are identified by the repeat units having the largest mole percent composition.

The poly(β-hydroxyorganoate)s of the present invention can be possibly either random or block copolymers, depending on the relative reactivities of the various monomers. However, they are generally random copolymers, particularly because they are generally prepared by bacteria. Typically, polymers having a large percentage of two different monomeric units are prepared by using two sources of feedstock for the bacteria to convert to a polymer.

A preferred class of polymers of the present invention include unsaturation in the side chains (in an uncrosslinked system). Preferably, these uncrosslinked polymers have no greater than about 20 mole percent monomeric units having unsaturation therein, and more preferably, about 1–10 mole percent. These monomeric units can have one or more double bonds in the sidechains, i.e., R groups. Another preferred class of polymers of the present invention include Cl, Br, or COOH groups in the side chain. Preferably, these uncrosslinked polymers have no greater than about 20 mole percent Cl, Br, or COOH groups.

The addition of one or more tackifiers to the compositions of the present invention can provide a PSA having improved tack, lower viscosity, improved coatability, and improved peel adhesion. Tackifiers can also improve the open time of an adhesive. Compatible tackifiers useful in the adhesive compositions of the invention include polar or nonpolar tackifiers. Preferably, they include rosin and rosin derivatives, resins derived by polymerization of $C_{5-9}$ unsaturated hydrocarbon monomers, such as polyterpenes and synthetic polyterpenes, and phenol-containing resins such as terpene phenolics and pure phenolic resins, and the like. As used herein, a "compatible" tackifier is one that is soluble at the molecular level in the PSA compositions with no phase separation.

Hydrocarbon tackifying resins can be prepared by polymerization of monomers consisting primarily of olefins and diolefins and include, for example, residual by-product monomers of the isoprene manufacturing process. These hydrocarbon tackifying resins typically exhibit Ball and Ring Softening Points of about 60° C. to about 145° C. Examples of commercially available hydrocarbon tackifying resins include, but are not limited to terpene polymers, such as polymeric resinous materials obtained by polymerization and/or copolymerization of terpene hydrocarbons such as the alicyclic, mono, and bicyclic monoterpenes and their mixtures, including carene, isomerized pinene, terpinene, terpentene, and various other terpenes.

Commercially available resins of the terpene type include the ZONAREZ terpene B-series and 7000 series available from the Arizona Chemical Corp., Wayne, N.J. Typical properties reported for the ZONAREZ terpene resins include Ball and Ring Softening Points of about 55° C. to 125° C. (ASTM E28-67), Acid Numbers of less than one (ASTM D465-59), and Saponification Numbers of less than one (ASTM D464-59). The terpene resin used in the examples below is a poly(β-pinene) resin, PICCOLYTE A135 available from Hercules Chemical Co. Inc., which has a Ball and Ring Softening Point of 135° C., as well as POLYPALE polyterpene from Hercules. Commercially available aromatic resins include WINGTACK+, an aromatic C5 resin, available from Goodyear, Akron, Ohio, and INCOPOL H100, a hydrogenated indene, available from Amoco, Chicago, Ill.

Phenolic modified terpene resins and hydrogenated derivatives thereof are also useful tackifiers for the PSA compositions of the present invention. For example, the resin product resulting from the condensation, in an acidic medium, of a bicyclic terpene and a phenol, as well as pure phenolic alkyl resins, are useful tackifiers. Phenolic terpene resins are commercially available under the tradename PICOTEX from Hercules Corporation, Wilmington, Del. Phenolic resins are commercially available from Georgia Pacific, Decatur, Ga., under the designation GP 2103.

Suitable natural and modified rosins include gum rosin, wood rosin, tall oil rosin, distilled rosin, hydrogenated rosin, dimerized rosin, and polymerized rosin. Rosin esters are particularly useful tackifiers because they have generally higher softening points and higher molecular weights than unmodified rosins. Ethylene glycol, glycerol, and pentaerythritol are the most common alcohols used for modification, e.g., esterification. Rosin esters are also quite stable and resistant to hydrolysis. Such stability typically increases with the extent of hydrogenation. Rosin ester tackifying agents useful in the compositions of the present invention have softening temperatures of about 65° C. to about 110° C. Preferred rosin ester tackifiers are glycerol rosin esters commercially available from a variety of sources. For example, glycerol rosin esters are available under the tradename FORAL 65, FORAL 85, FORAL 105, and FORAL AX from Hercules Corp., Wilmington, Del.

Any combination of tackifiers can be used to improve tack. Preferably, a tackifier, or combination of tackifiers, is chosen such that the level of tack of the poly(β-hydroxyorganoate)s can be adjusted, depending on the application. More preferably, the tackifier is a biodegradable tackifier, such as glycerol rosin esters. An amount of a tackifier is used effective to adjust the tack of the adhesive for the application desired. Preferably, the total amount of tackifier(s) in the compositions of the present invention is less than about 400 parts, more preferably 3–250 parts, and most preferably 11–150 parts, by weight per 100 parts of polymer. In corresponding weight percentages, the total amount of tackifier(s) in the compositions of the present invention is preferably less than about 80 wt-%, more preferably in a range of about 3–71 wt-%, and most preferably 10–60 wt-%.

The PSA films of the present invention can be crosslinked to improve the internal strength of the adhesive. For example, the shear adhesion of a tackified composition can be enhanced by crosslinking with no loss of peel adhesion. They can be crosslinked by radiation, e.g., e-beam, with or without a crosslinking agent. For example, without the presence of a crosslinking agent, e.g., crosslinker, sensitizer, or photoinitiator, radicals can be generated in the polymer that can then crosslink. Alternatively, a crosslinking agent can be added to assist in crosslinking and/or become incorporated into the crosslinked polymer. Crosslinking agents that do not require radiation activation can also be used, such as certain chemical crosslinkers. Thus, suitable crosslinking agents can be chemical crosslinkers, either organic or inorganic crosslinkers, or radiation active crosslinkers. Other crosslinking agents include thermal initiators, photoinitiators, and sensitizers. If desired, a crosslinking agent is used in an amount effective to cause crosslinking and improve the internal strength of the adhesive. It should be understood that a mixture of crosslinking agents can be used to advantage, such as a photoinitiator and a sensitizer.

Suitable thermal initiators include, but are not limited to, peroxides such as benzoyl peroxide, dibenzoyl peroxide, cumyl peroxide, di-t-butyl peroxide, methyl ethyl keto peroxide, and nitriles such as azobisisobutyronitrile. Certain of these thermal initiators are also chemical crosslinkers. Preferably, a thermal initiator, or mixture of thermal initiators, (or chemical crosslinker) can be present in the PSA compositions in an amount of about 0.05–11 parts, more preferably about 0.1–5.3 parts, and most preferably about 0.1–3.1 parts, by weight of 100 parts of the polymer. In corresponding weight percentages (based on the total weight of the composition), the total amount of thermal initiator(s) in the compositions of the present invention is preferably in a range of about 0.05–10 wt-%, more preferably about 0.1–5.0 wt-%, and most preferably about 0.1–3.0 wt-%.

Suitable photoinitiators include, but are not limited to: aldehydes, such as benzaldehyde, acetaldehyde, and their substituted derivatives; ketones such as acetophenone, benzophenone, bisbenzophenone, polybenzophenone, and their substituted derivatives such as SANDORAY 1000 (Sandoz Chemicals, Inc., Charlotte, N.C.); quinones photoinitiator such as the benzoquinones, anthraquinone and their substituted derivatives; thioxanthones such as 2-isopropylthioxanthone and 2-dodecylthioxanthone; and certain chromophore-substituted vinyl halomethyl-symtriazines such as 2,4-bis(trichloromethyl)-6-(3',4'-dimethoxyphenyl)-sym-triazine. Certain of these photoinitiators are also radiation crosslinkers, such as bisbenzophenone and triazines. Preferably, a photoinitiator, or mixture of photoinitiators, (or alternatively, radiation active crosslinker(s)) can be present in the PSA compositions in an amount of about 0.05–11 parts, more preferably about 0.1–5.3 parts, and most preferably about 0.1–3.1 parts, by weight of 100 parts of the polymer. In corresponding weight percentages (based on the total weight of the composition), the total amount of photoinitiator(s) in the compositions of the present invention is preferably in a range of about 0.05–10 wt-%, more preferably about 0.1–5.0 wt-%, and most preferably about 0.1–3.0 wt-%.

Suitable sensitizers include, but are not limited to, xanthone, acetophenone, benzaldehyde, o-dibenzoylbenzene, benzophenone, 2-acetylfluorenone anthraquinone, flavone, Micheler's ketone, 4-acetylbiphenyl, β-naphthyl phenyl ketone, β-naphthaldehyde, β-acetonaphthone, α-acetonaphthone, α-naphthaldehyde, biacetyle, benzil, flurorenone, and duroquinone. Preferably, a sensitizer, or mixture of sensitizers, can be present in the PSA compositions in an amount of about 0.05–11 parts, more preferably about 0.1–5.3 parts, and most preferably about 0.1–3.1 parts, by weight of 100 parts of the polymer. In corresponding weight percentages (based on the total weight of the composition), the total amount of sensitizer(s) in the compositions of the present invention is preferably in a range of about 0.05–10 wt-%, more preferably about 0.1–5.0 wt- %, and most preferably about 0.1–3.0 wt-%.

The adhesive compositions containing radiation crosslinkers, photoinitiators, and sensitizers, can be cured using a source of radiation of sufficient energy (i.e., wavelength range) to generate free radicals when incident upon the particular crosslinking agent selected for use in the composition. The preferable wavelength range for the crosslinking agents disclosed above is about 400–250 nm. The radiant energy in this preferred range of wavelengths required to crosslink the adhesive film of the invention is about 50–5000 milliJoules/cm$^2$ and more preferably about 100–1000 milliJoules/cm$^2$.

Crosslinked adhesive films prepared from the PSA compositions of the present invention preferably have a percent gel in the range of about 2–95 weight percent, more preferably about 30–80 weight percent, and most preferably about 50–70 weight percent. As used herein, the percent gel is corrected for soluble tackifying resins and other additives as hereinafter described.

Minor amounts, i.e., less than about 50 wt-%, of additives can also be included in the composition to provide adhesives for particular advantage and for special end uses. Such additives may include pigments, dyes, fillers, stabilizers, ultraviolet absorbers, antioxidants, processing oils, and the like. Antioxidants can be used to stabilize static shear, for example. Plasticizers can also be used, however, they are not particularly desirable-because they tend to reduce the internal strength of the adhesive. Preferred additives are those that are degradable. Preferably, the amount of additives used can vary from 0. 1 to 50 weight percent depending on the end use desired.

The adhesive compositions of the present invention are easily coated on suitable flexible or inflexible backing materials, preferably flexible backing materials, by conventional coating techniques to produce coated adhesive sheet materials in accord with the present invention. The flexible backing material can be any material conventionally utilized as a tape backing, as well as other flexible materials. Examples of substrate materials, i.e., backing materials, include, but are not limited to: polymer films such as polyester (e.g., polyethylene terephthalate), polypropylene (e.g., biaxially oriented polypropylene), polyethylene, polyvinyl chloride, polyurethane, cellulose acetate, and ethyl cellulose; woven and nonwoven fabrics formed of threads or fibers of synthetic or natural materials such as cotton, nylon, rayon, glass, or ceramic material; metals and metal foils such as aluminum, copper, lead, gold and the like; paper; glass; ceramics; and composite materials comprised of laminates of one or more of these materials. Preferably, the adhesive composition can be coated on degradable substrates such as degradable plastic films, paper, and woven or nonwoven fabrics made of degradable threads or fibers.

The PSA compositions of the present invention can be coated from solution by any of the coating processes well known in the art, such as knife coating, roll coating, gravure coating, curtain coating, spray coating, etc. Furthermore, the PSA compositions of the invention can be applied by extrusion coating, coextrusion coating, thermal coating, and the like, with no solvent present, thereby eliminating environmental and toxicity problems associated with solution coating processes. Useful coating thicknesses for the present invention are in the range of about 12–2500 μm, preferably in the range of about 25–250 μm, and more preferably, in the range of about 25–125 μm.

Another embodiment of the invention comprises a laminated structure of at least a first and a second substrate, the substrates being joined by a layer of the adhesive composition of the invention. At least one of the substrates is capable of transmitting radiation so that the adhesive film can be crosslinked.

Objects and advantages of this invention are further illustrated by the following examples. The particular materials and amounts thereof recited in these examples as well as other conditions and details, should not be construed to unduly limit this invention. All materials are commercially available except where stated or otherwise made apparent.

EXAMPLES

The following nonlimiting examples include exemplary preparations of the adhesives of the invention. All parts, percentages, ratios, etc., herein and in the rest of the specification are by weight unless otherwise specified.

Preparation and Characterization of Poly(β-Hydroxyorganoate)s

The polymers used in the PSA compositions of the present invention can be prepared according to the procedures described in K, Fritzsche et al., Int. *J. Biol. Macromol*, 12 85–91 (1990); H. Brandl et al., *Applied Environ. Microbiol.*, 54 1977–1982 (1988); R. W. Lenz et at., *FEMS Microbiology Reviews*, 103, 207–214 (1992); R. A. Gross et al., *Macromolecules*, 22, 1106–1115 (1989); B. Hazer et al., Macromolecules, 27, 45–49 (1994); R. Peres et at., Polymer, 35, 1059–1067 (1994); K. Fritzsche et at., Makromol. Chem., 191, 1957–1965 (1990); and U.S. application Ser. No. 07/939,248, filed on Sep. 2, 1992, entitled "Production of Polyhydroxyalkanoates from Pseudomonas."

Bacterial strain

The organism used was *Pseudomonas oleovorans* (ATCC 29347). Stock cultures were stored on agar plates at 4° C. Medium composition, stock culture, and inoculum preparation are described in detail in T. L. Bluhm et al., *Macromolecules*, 19, 2871–2876 (1986).

Growth Condition

The experiments were carried out with a growth medium containing the following materials: $(NH_4)_2HPO_4$, 45 mM; $K_2HPO_4$, 33 mM; $KH_2PO_4$, 27 mM; and $MgSO_4$, 2.5 mM. A microelement solution was added (0.1% v/v) which contained the following (per liter of 1N HCl): 2.78 g $FeSO_4.7H_2O$; 1.98 g $MnCl_2.4H_2O$; 2.81 g $CoSO_4.7H_2O$; 1.67 g $CaCl_2.2H_2O$; 0.17 g $CuCl_2.2H_2O$; 0.29 g $ZnSO_4.7H_2O$.

The medium was supplemented with 25 mM sodium octanoate for the preparation of poly(β-hydroxyoctanoate) ("PHO"); 40 mM sodium nonanoate for the preparation of poly(β-hydroxynonanonoate) ("PHN"); 25 mM total mixture of a 9:1 molar ratio of sodium octanoate and sodium undecanoate for the preparation of poly(β-hydroxyoctanoate-co-β-hydroxy- 11-undecenoate)("PHO/U"), 15 mM each of sodium octanoate and sodium nonanoate for the preparation of poly(β-hydroxyoctanoate-co-β-hydroxynonanoate) ("PHO/N"). The pH was adjusted to 7.0. These sodium salt feedstocks were prepared in situ from NaOH and the corresponding acid.

Shake flask cultures were cultivated in 500 mL Erlenmeyer flasks, containing 200 mL of medium at 30° C. and 150 rpm (revolutions per minute). Modified flasks were indented to improve the aeration of the culture during shaking. Fermentor cultures were cultivated in a 2-liter Biostat E bioreactor (B. Braun Biotech Inc., Allentown, Pa.) The culture volume was 1.0 L; the temperature was maintained at 30° C. and pH at 7.0; stirring was carried out at 250 rpm; and the aeration rate was 2.0 L of air per minute. Larger fed batch cultures were grown in Microferm 114 fermentors (New Brunswick Scientific, Edison, N.J.) using culture volumes of 12 L; aeration was at 5 L/minute; stirring was carried out at 250–300 rpm; and temperature and pH were maintained at 30° C. and 7.0, respectively. Feedstock (120 mL), consisting of 1.0M sodium octanoate (or other sodium salt of an organic acid), and 125 mM mM $NH_4^+$ growth media (final culture concentration of 10 mM and 2.5 mM $NH_4^+$ respectively) were added after 10 hours growth, and at 2 hour intervals thereafter. For other salts of organic acid feedstocks, the addition was such as to maintain growth. Cultures were harvested after 18 hours. Harvest times for other polymers were: 72 hours for PHN; 22 hours for PHO/N; 24 hours for PHO/U. Dissolved oxygen was measured using a polarographic electrode (obtained from Ingold Inc., Wilmington, Mass.). Oxygen consumption of the culture was determined by analyzing the oxygen concentration in the air inlet and outlet of the bioreactor using an OM-14 oxygen analyzer (Beckman Inc., Wakefield, Mass.). These parameters yielded a maximum oxygen transfer rate of 250 mL $L^{-1}h^{-1}$. In continuous cultures, growth rates were established by increasing the cell density, and adjusting the dilution rate to maintain a given cell density. Aeration was constant at 2.0 liter of air per minute. All continuous culture experiments were done using the Biostat E bioreactor.

Cell growth was determined photometrically by measuring the optical density (O.D.) of the culture at 660 nm, gravimetrically by weighing the amount of dry cells after washing and lyophilization and also by plate counting methods. Cells were harvested by centrifugation (4° C., 12000× g, 15 minutes) resuspended in distilled water, and repelleted. Plate counting was done using stock culture media with 2% agar added, incubated overnight at 30° C. and counted. Only those plates with between 20 and 100 colonies were counted.

Poly(β-hydroxyorganoate) Quantification and Analysis

To determine the polymer content and composition of lyophilized whole cells the intracellular poly(β-hydroxyorganoate) was degraded to its constituent hydroxycarboxylic acid methyl esters by methanolysis. The methyl esters were then assayed by gas chromatography according to the method described in H. Brandl et at., *Appl. Environ. Microbiol.*, 54, 1977–1982 (1988), the description of which is incorporated herein by reference.

Extraction of the Polymer

Poly(β-hydroxyorganoate) was extracted from lyophilized cells into chloroform using a soxhlet extractor, precipitated in 10 volumes of methanol, centrifuged, and allowed to dry to constant weight according to the procedure outlined in H. Brandi et al., *Appl. Environ, Microbiol,* 54, 1977–1982 (1988), the description of which is incorporated herein by reference.

Molecular Weight Determination

The molecular weight of the extracted polymer was determined by gel permeation chromatography. Chloroform was used as the eluent at a flow rate of 1.0 mL/minute. Polymer samples were dissolved in chloroform (20 mg/mL) and 100 microliters of this solution was analyzed. Calibration curves were generated using polystyrene standards. The $M_w$ (weight average molecular weight), $M_n$ (number average molecular weight), and PDI (polydispersity index) are reported.

PHO Analysis

Molecular weight determination was done by Gel Permeation Chromatography in chloroform solvent using polystyrene standards. Repeat unit analysis was done using Gas Chromatography. The poly(β-hydroxyorganoate) undergoes methanolysis, and the 3-hydroxy methyl esters of the hydrolyzed acid repeat units were analyzed.

| | Gas Chromatography | |
|---|---|---|
| SIDE CHAIN LENGTH | REPEAT UNIT | MOLE % |
| C-3 | C-6 | 12 |
| C-5 | C-8 | 88 |

Thermal Analysis
$T_g = -36°$ C.
$T_m = 56°$ C.
$\Delta H_m = 24.0$ J/g
Molecular Weight Determination
$M_w = 210,000$
$M_n = 94,000$
PDI = 2.2

PHN Analysis

Molecular weight determination was done by Gel Permeation Chromatography in chloroform solvent using polystyrene standards. Repeat unit analysis was done using Gas Chromatography. The poly(β-hydroxyorganoate) undergoes methanolysis, and the 3-hydroxy methyl esters of the hydrolyzed acid repeat units are analyzed.

| | Gas Chromatography | |
|---|---|---|
| SIDE CHAIN LENGTH | REPEAT UNIT | MOLE % |
| C-2 | C-5 | 4.6 |
| C-4 | C-7 | 42.6 |
| C-6 | C-9 | 52.9 |

Thermal Analysis
$T_g = -34°$ C.
$T_m = 49°$ C.
$\Delta H_m = 24.3$ J/g
Molecular Weight Determination
$M_w = 143,000$
$M_n = 57,100$
PDI = 2.5

PHO/N Analysis

The PHO/N polymer was analyzed using GC, DSC, and GPC methodology. Analyses were done to determine the repeat unit composition, melting and glass transition temperatures, and the molecular weight of the samples. Molecular weight was determined by GPC using polystyrene standards. The results of these analyses are tabulated below.

| | Gas Chromatography | |
|---|---|---|
| SIDE CHAIN LENGTH | REPEAT UNIT | MOLE % |
| C-3 | C-6 | 3.6 |
| C-4 | C-7 | 12.7 |
| C-5 | C-8 | 37.4 |
| C-6 | C-9 | 21.6 |
| C-7 | C-10 | 0.7 |
| C-8 | C-11 | 12.9 |
| C-9 | C-12 | 11.0 |

Thermal Analysis
- $T_g = -32.2°$ C.
- $T_m = 56.9°$ C.
- $\Delta H_m = 15.0$ J/g Molecular Weight Determination
- $M_w = 209,000$
- $M_n = 69,000$
- PDI=3.03

PHO/U[1] Analysis

The PHO/U[1] polymer was analyzed using GPC, NMR, and DSC methodology. Analyses were done to determine, melting and glass transition temperatures and the molecular weight of the samples. Molecular weight was determined by GPC using polystyrene standards. The results of these analyses are tabulated below.

Thermal Analysis
- $T_g = -34°$ C.
- $T_m = 59°$ C.
- $\Delta H_m = 22.0$ J/g

Molecular Weight Determination
- $M_w = 165,000$
- $M_n = 62,000$
- PDI=2.7

Proton NMR Analysis Analysis of the proton NMR of the sample indicated that there is 7–9% unsaturated repeat units in the polymer.

PHO/U[2] Analysis

The PHO/U[2] polymer was analyzed using GPC, NMR, and DSC methodology. Molecular weight was determined by GPC using polystyrene standards. The results of these analyses are tabulated below.

Thermal Analysis
- $T_m = 46.6°$ C.
- $\Delta H_m = 3.4$ J/g

Molecular Weight Determination
- $M_w = 164,000$
- $M_n = 62,000$
- PDI=2.60

Proton NMR Analysis Analysis of the proton NMR of the sample indicated thatthere is 12–16 % unsaturated repeat units in the polymer.

Test Methods

The test procedures used in the examples to evaluate and compare the properties of the PSA compositions and tapes made from them are industry standard tests. These tests are described in detail in various publications of the American Society for Testing Materials (ASTM), Philadelphia, Pa. and the Pressure Sensitive Tape Council (PSTC), Glenview Ill. References to these standards are also given.

Shear Strength (ASTM D-3654-78)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in units of time (minutes) required to pull a standard area of PSA coated sheet material from a stainless steel test panel under stress of a constant, standard load.

The tests were conducted on adhesive coated strips applied to a stainless steel panel such that a 12.7 mm by 12.7 mm portion of each strip was in firm contact with the panel, with one end portion of the tape being free. The panel with coated strip attached was held in a rack such that the coated surface of the panel formed an angle of 182° with the vertical tape free end, which was then tensioned by application of a force of one kilogram applied as a hanging weight from the free end of the coated strip. The 2° greater than 180° was used to negate peel adhesions, thus insuring that only the shear forces were measured in order to more accurately determine the holding power of the tape being tested. The time elapsed for each test specimen to separate from the steel panel was recorded as the shear strength.

Mode Of Failure (MOF)

The time at which the mass falls is called "Shear Test" and is reported as "10,000+" if the tape has not failed after 10,000 minutes. With each Shear is indicated the mode of failure as follows:

PO=pop-off, i.e.,75–100% adhesive failure from steel plate;

CF=adhesive split: both surfaces completely covered by adhesive;

NTR=residue failure: adhesive covering 100% of backing with a small residue transferred to panel;

The pop-off failure mode is preferred because it is indicative of adhesive failure of the adhesive/steel interfacial bond as opposed to cohesive failure of the adhesive. Adhesives of various shear adhesions, all within the range of the present invention (1–10,000+ minutes), are preferred depending on end-use applications. Two specimens of each tape were tested and the shear tests were averaged to obtain the shear value.

Peel Adhesion (ASTM D 3330-76)

The peel adhesion is the force required to remove a PSA coated test specimen from a test panel measured at a specific angle and rate of removal. In the examples, this force was expressed in Newtons per decimeter (N/din) width of coated sheet. The procedure followed was:

1) A test specimen 12.7 mm wide was applied to a horizontally
positioned clean glass test plate. A 2.2 kg rubber roller was used to press a 12.7 cm length of specimen into firm contact with the glass surface.

2) The free end of the specimen was doubled back nearly touching itself so the angle of removal was 180°. The free end was attached to the adhesion tester scale.

3) The glass test plate was clamped in the jaws of tensile testing machine, which was capable of moving the plate away from the scale at a constant rate of 2.3 meters per minute.

4) The scale reading in Newtons was recorded as the tape was peeled from the glass surface.

Percent Gel Test (ASTM D 3616-82)

The percent gel is used as an indication of cure level. The percent gel is 100 times the gelled mass divided by the total mass of material that is capable of forming a gelled network.

Crosslinking improves the creep and shear resistance of pressure-sensitive adhesives. The transition from a cohesive to an adhesive failure during peeling advances to a lower peel rate and higher temperature with an increase in crosslink density.

Many important properties of crosslinked pressure-sensitive adhesives vary with the gel content. Hence, determination of the gel content provides a means for controlling the process and thereby raising the quality of the tape.

Extraction tests permit verification of the proper gel content of polymers in the PSAs and they also permit comparison between different crosslinked adhesives and their specific end uses.

Gel Content Determination:

A square test specimen (3.81 cm×3.81 cm) containing approximately 0.15 g of PSA was cut from the tape and placed in a 120-mesh stainless steel basket measuring approximately 4×8 cm. The contents were weighed to the nearest 0.1 mg and then immersed in a capped beaker containing sufficient toluene to cover the specimen. After extraction for 48 hours, the basket (containing the specimen) was removed, drained, and placed in an oven at 93° C. The basket and specimen were dried to a constant weight and the gel content was determined as follows:

$$\text{Extract \%} = \frac{\text{weight lost during extraction}}{\text{weight of original specimen}} \times 100$$

Gel content = 100 − percent extract

Two specimens of each tape were tested and the results were averaged to obtain the gel content value.

Biodegradability Test for Poly(hydroxyorganoate) Adhesives in the Presence of *Ps. Maculicola*

*Ps. Maculicola* (previously ATCC 11781) was obtained from the Department of Microbiology, University of Massachusetts Amherst, Amherst, MA. The organism was cultured on E* media agar plates with the addition of 20 mM glucose at 37° C. for 48 hours. E* media agar plates were prepared from the following recipe: 5.94 g of $(NH_4)_2HPO_4$; 5.8 g of $K_3PO_4$; and 3.7 g of $KH_2PO_4$. The above dry mix was added to 1.0 L of water containing 15.0 g of granular agar. The media was supplemented with the following trace elements: 20 mL of 100 mM $MgSO_4$; and 1.0 mL of the micro-elements solution (1.0 L of 1.0M HCl containing: 2.78 g $FeSO_47H_2O$; 1.98 g of $MnCl_2.4H_2O$; 2.81 g of $CoSO_47H_2O$; 1.67 g of $CaCl_2.2H_2O$; 0.17 g of $CuCl_2.2H_2O$; and 0.29 g of $ZnSO_4.7H_2O$.

An inoculum suspension was prepared in E* media broth using a 48 hour culture of the *Ps. Maculicola* to a density of a 0.5 McFarland Turbidity Standard #1 (approximately $10^8$ organisms per mL).

The adhesive samples were cut into 1.25×1.25 or 1.25×0.7 cm pieces and were attached to the bottom of sterile polystyrene dishes (100×25 mm) with epoxy (either a DEV-TUBE 5-minute epoxy from Devcon, Illinois Tool Works, Danvers, Mass., or an extra fast setting epoxy from Hardman, Inc., Belleville, N.J.) with the test adhesive exposed. The epoxy was allowed to cure for at least 2 weeks at room temperature. To each petri dish was added 50 mL of E* media broth containing 10 mM glucose. The inoculum (50 μl) was added to each petri dish and the samples were incubated at 28° C. for various time periods. Two sets of samples were prepared. In the first set, the inoculum and nutrient broth solutions were replaced at 14 days. In the second set, the same suspension was used for the duration of the test. At 7, 14, 21, and 28 days, sample sets were removed from the incubator, rinsed with deionized water, and allowed to dry.

The adhesive samples were then visualized using scanning electron microscopy to determine if bacterial attachment to the surface had occurred and if etching or erosion of the surface had occurred.

EXAMPLE 1

An Adhesive Containing Poly(hydroxynonanoate) [PHN]

A laboratory scale coating was prepared by allowing 4 g of poly(β-hydroxynonanoate) (prepared as described above) to dissolve in 8 g of chloroform. This solution was knife-coated onto a 2 mil (50 μm) PET backing (Minnesota Mining and Manufacturing, St. Paul, Minn.) using a hand-spread coater. The handspread was dried at room temperature for 12 hours to remove the chloroform and the dry coating thickness was 23 μm. The sample was cut for use in the test procedures described for peel adhesion and shear strength and the results are shown in Table 1.

EXAMPLE 2

An Adhesive Containing a UV-cured PHN

The laboratory scale coating of Example 2 was prepared in the same manner as that in Example 1, except that to the chloroform solution was added 12 mg of IRGACURE 184 (Ciba Geigy, Chicago, Ill.). The coating thickness was 20 μm. The handspread was subjected to UV (15 W black lights, 1 hour at a distance of 10 cm) radiation after drying to effect a degree of crosslinking. The peel and shear test results for this material are shown in Table 1.

EXAMPLE 3

A Tackified Adhesive Containing PHN

The laboratory scale coating of Example 3 was prepared in the same manner as that in Example 1, except that 2.67 g of polymer was used, and to the chloroform solution was added 1.33 g of FORAL 85 hydrogenated rosin ester (Hercules Chemical, Wilmington, Del.). The coating thickness was 20 μm. The peel and shear test results for this material are shown in Table 1.

EXAMPLE 4

A Tackified UV-cured Adhesive Containing PHN

The laboratory scale coating of Example 4 was prepared in the same manner as that described in Example 2, except that 2.67 g of polymer was used, and to the chloroform solution was added 1.33 g of FORAL 85 hydrogenated rosin ester. The coating thickness was 28 μm. The peel and shear test results are shown in Table 1.

EXAMPLE 5

A UV-cured PHN Adhesive with Tackifier Resin

The laboratory scale coating of Example 5 was prepared in the same manner as that described in Example 4, except that to 0.40 g of poly(β-hydroxynonanoate), 0.20 g of FORAL 85 and 6 mg of benzophenone (Aldrich Chemical Co., Milwaukee, Wis.) were added 1.33 g of chloroform. The dry coating thickness was 25 μm. The peel and shear tests for this UV-cured tape are shown in Table 1.

EXAMPLES 6–31

Examples 6–31 were prepared as described in Example 5, except that the ratio PHN:tackifier:photoinitiator ratio was varied for different types and concentrations of tackifying resins and different types and concentrations of crosslinking agent. The compositional information and the coating thickness are shown in Table 1. The results of the peel and shear tests for these UV-cured tapes are shown in Table 1.

EXAMPLES 32–37

An Adhesive Containing poly(β-hydroxyoctanoate) [PHO]

Examples 32–37 were prepared as described in Example 5, except that the polymer used was poly(β-hydroxyoctanoate) (prepared as described above) and different types and concentrations of tackifying resins and crosslinking agents were used. The data describing the peel and shear test results are shown in Table 2.

EXAMPLE 38

An Adhesive Containing Poly(β-hydroxyoctanoate-co-β-hydroxynonanoate) [PHO/N]

Figure 2:
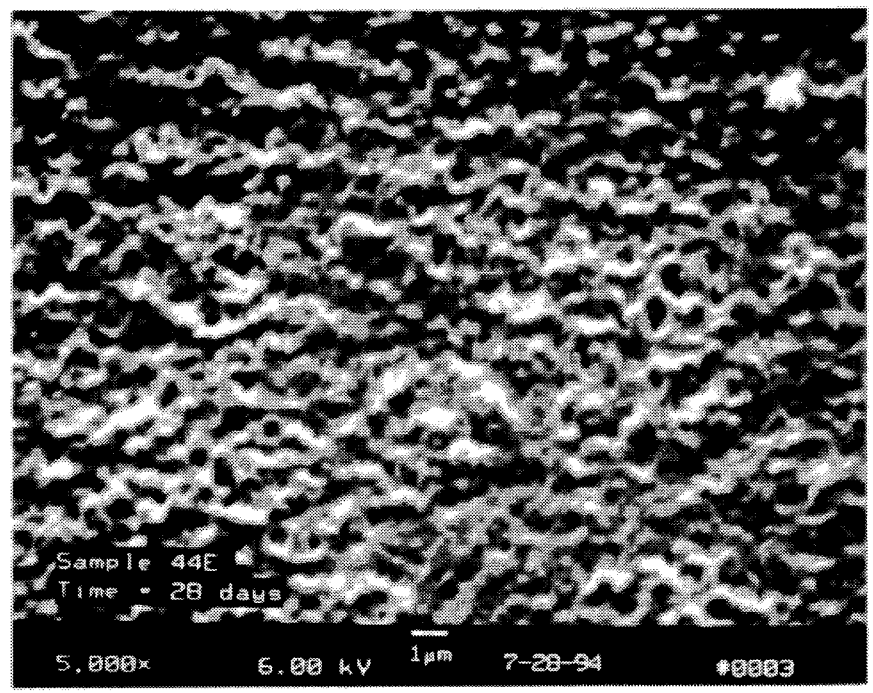
FIG. 2 is a Scanning Electron Micrograph of the adhesive of Example 38 after exposure for 28 days to the Biodegradability Test, with replacing inoculum and nutrient solutions at day 14.
Figure 3:
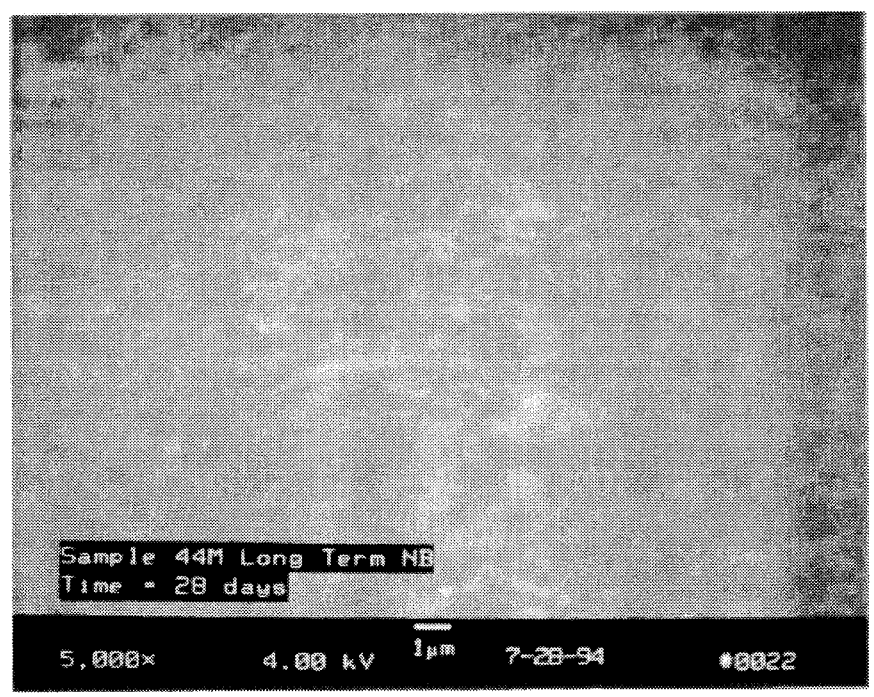
FIG. 3 is a Scanning Electron Micrograph of the adhesive of Example 38 after exposure for 28 days to the Biodegradability Test, without replacing inoculum and nutrient solutions at day 14.

A laboratory scale coating was prepared by allowing 0.4 g of poly(β-hydroxyoctanoate-co-β-hydroxynonanoate) (prepared as described above) to dissolve in 0.8 g of chloroform. This solution was knife-coated onto a 2 mil (50 µm) PET backing (Minnesota Mining and Manufacturing, St. Paul, Minn.) using a handspread coater. The handspread was dried at room temperature for 12 hours to remove the chloroform. The dry coating thickness was 25 µm. The sample was cut for use in the test procedures described for peel adhesion and shear strength. The results are shown in Table 3. The material of Example 38 was subjected to the Biodegradability Test described above. The results of the test are shown in Figures 2 and 3, which are Scanning Electron Micrographs of the sample after 28 days exposure, with and without replacing the inoculum and nutrient broth solutions at 14 days, respectively. For reference, a micrograph of the initial sample is included as FIG. 1.

FIG. 1 shows a smooth surface of the sample as coated from solution. The surface shown in FIG. 2 has been eroded by the action of the microorganisms, i.e., biodegradation. The extent of biodegradation was greater when the inoculum and nutrient broth solutions were replaced at 14 days as shown in comparing FIG. 2 (replaced) and FIG. 3 (not replaced).

EXAMPLES 39–65

Figure 5:
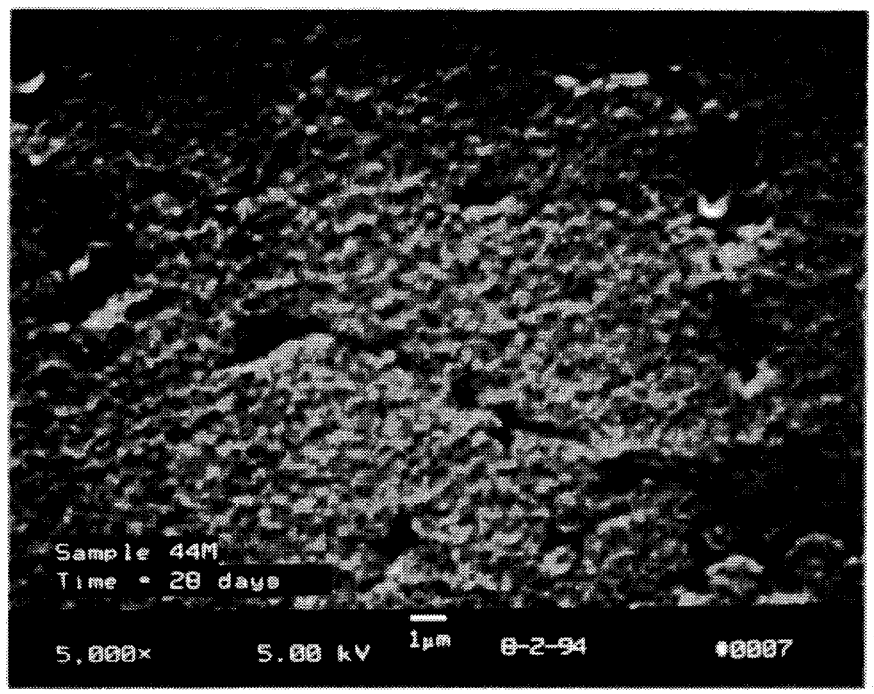
FIG. 5 is a Scanning Electron Micrograph of the adhesive of Example 41 after exposure for 28 days to the Biodegradability Test with replacing inoculum and nutrient solutions at day 14.
Figure 6:
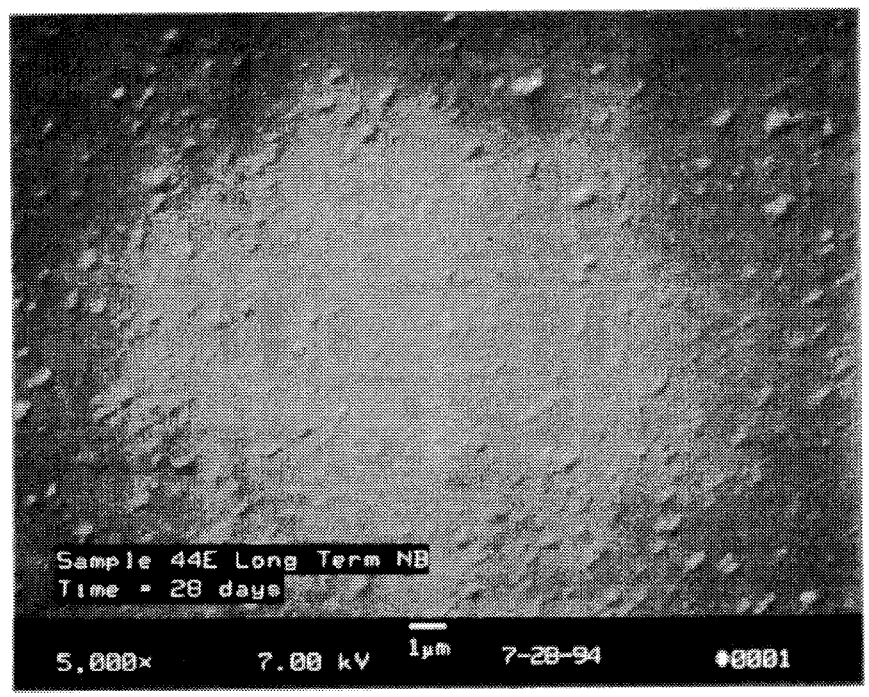
FIG. 6 is a Scanning Electron Micrograph of the adhesive of Example 41 after exposure for 28 days to the Biodegradability Test without replacing inoculum and nutrient solutions at day 14.

Adhesive tapes containing PHO/N were prepared as described in Example 38, except to 0.4 g of PHO/N was added 0.20 g of a tackifier resin and an amount of crosslinking agent as described in Table 3. Different types and concentrations of tackifying resins and crosslinking agents. The data describing the peel and shear test results are shown in Table 3. A larger quantity sample of Example 41 was prepared in the same manner in order to provide samples for the Biodegradability Test. The results in the biodegradability test on Example 41 are shown in FIGS. 5 and 6, which are Scanning Electron Micrographs of the sample at 28 days exposure, with and without replacing the inoculum and nutrient broth solutions at 14 days, respectively. For reference, a micrograph of the initial sample is included as FIG. 4.

Figure 4:
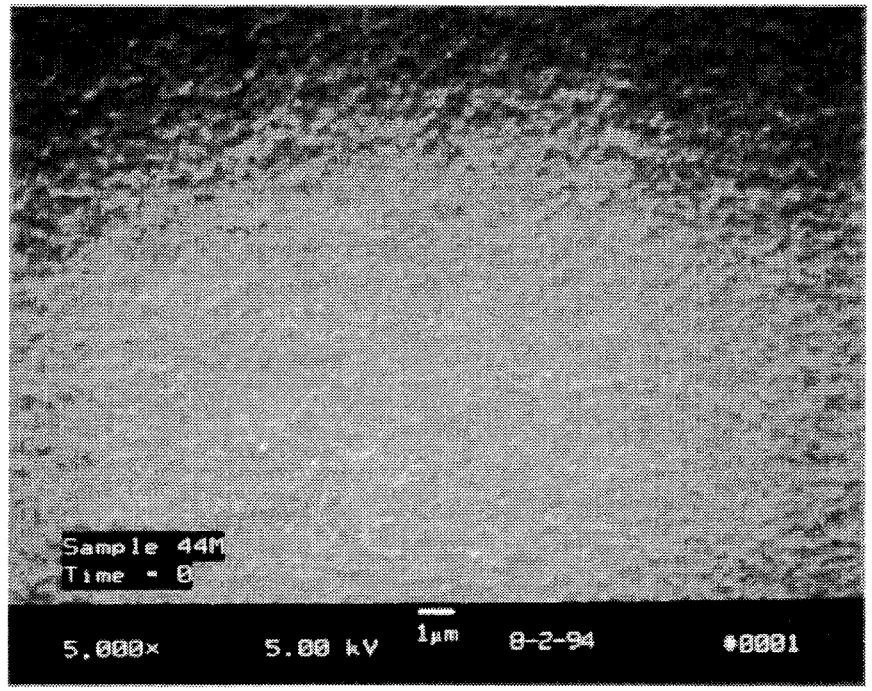
FIG. 4 is a Scanning Electron Micrograph of the adhesive of Example 41 as cast from solution.

FIG. 4 shows the surface of Example 41 as coated from solution. The surface shown in FIG. 5 has been eroded by the action of the microorganisms, i.e., biodegradation, after 28 days in the Biodegradability Test. The extent of biodegradation was greater when the inoculum and the nutrient broth solutions were replaced at 14 days, as can be seen in comparing FIG. 5 (replaced) and FIG. 6 (not replaced).

EXAMPLE 66

An Adhesive Containing Poly(β-hydroxyoctanoate-co-β-hydroxy-10-undecenoate) [PHO/U]

A laboratory scale coating was prepared by allowing 0.4 g of poly(β-hydroxyoctanoate-co-β-hydroxyundecenoate) (prepared as described above) to dissolve in 0.8 g of chloroform. This solution was knife-coated onto a 2 mil (50 µm) PET backing (Minnesota Mining and Manufacturing, St. Paul, Minn.) using a handspread coater. The handspread was dried at room temperature for 12 hours to remove the chloroform. The dry coating thickness was 20 µm. The sample was cut for use in the test procedures described for peel adhesion and shear strength. The results are shown in Table 4.

EXAMPLES 67–90

Adhesive tapes containing PHO/U were prepared as described in Example 66, except to 0.4 g of PHO/U was added 0.20 g of a tackifier resin and an amount of crosslinking agent as described in Table 3. PHO/U of two different compositions was used in the preparation of the adhesives. The difference is noted in Table 4. PHO/U[1] contains 7–9 mole-% unsaturated side chains and PHO/U[2] contains 12–16 mole-% unsaturated side chains. Different types and concentrations of tackifying resins and crosslinking agents were used. The data describing the peel and shear test results are shown in Table 4.

EXAMPLES 91–96

Preparation of UV cured Adhesives for use in the % Gel Test

Examples 91–96 were prepared as described in Example 2, except that either PHN or PHO/U was used as the polymer and various amounts of the photoinitiator, benzophenone (Aldrich Chemical Co., Milwaukee, Wis.), was used. The compositional information and the results of the % Gel Test are described in Table 5.

TABLE 1

| Ex # | Composition | Coating wt thickness (µm) | 180° peel (glass) (N/dm) | Static shear (min) | MOF in shear |
|---|---|---|---|---|---|
| 1 | PHN | 23 | 1 | 13 | PO |
| 2 | PHN, 0.3% IRGACURE 184 | 20 | 1 | 14 | PO |
| 3 | PHN, 35% FORAL 85 | 20 | 81 [AT] | 1 | CF |
| 4 | PHN, 35% FORAL 85, 0.3% IRGACURE 184 | 23 | 82 [AT] | 1 | CF |
| 5 | PHN, 35% FORAL 85, 1% Bzophn | 28 | 79 [CF] | 2 | CF |
| 6 | PHN, 35% FORAL 85, 9% Bzophn | 20 | 28 s | 2 | CF |

TABLE 1-continued

| Ex # | Composition | Coating wt thickness (μm) | 180° peel (glass) (N/dm) | Static shear (min) | MOF in shear |
|---|---|---|---|---|---|
| 7 | PHN, 35% FORAL AX, 1% Bzophn | 28 | 66 [CF] | 1 | CF |
| 8 | PHN, 30% FORAL AX, 10% Bzophn | 28 | 85 [CF] | 2 | CF |
| 9 | PHN, 35% FORAL AX, 0.15% MPBT | 25 | 50 [CF] | 1 | CF |
| 10 | PHN, 35% PICCOLYTE A135, 1% Bzophn | 20 | 29 s | 167 | CF |
| 11 | PHN, 30% PICCOLYTE A135, 10% Bzophn | 25 | 106 [CF] | 1128 | CF |
| 12 | PHN, 32% PICCOLYTE A135, 5% Bzophn | 25 | 33 s, [CF] | 1133 | CF |
| 13 | PHN, 35% PICCOLYTE A135, 0.15% MPBT | 25 | 74 | 36 | CF |
| 14 | PHN, 35% REGALRITE 355, 1% Bzophn | 25 | 69 | 2 | CF |
| 15 | PHN, 30% REGALRITE 355, 10% Bzophn | 25 | 87 [PO] | 6 | CF |
| 16 | PHN, 35% REGALRITE 355, 0.15% MPBT | 23 i | 19 | 3 | CF |
| 17 | PHN, 35% GP 2103, 1% Bzophn | 23 | 136 s, [CF] | 11 | CF |
| 18 | PHN, 30% GP 2103, 10% Bzophn | 23 | 93 [CF] | 1 | CF |
| 19 | PHN, 35% GP 2013, 0.15% MPBT | 23 | 92 | 20 | CF |
| 20 | PHN, 30% POLYPALE, 10% Bzophn | 25 | 83 [PO/CF] | 2 | CF |
| 21 | PHN, 35% POLYPALE, 0.15% MPBT | 25 si | 59 | 5 | CF |
| 22 | PHN, 30% EASTOTAC H100R, 10% Bzophn | 25 i | 4 [PO] | 10,000+ | |
| 23 | PHN, 30% INDOPOL H100, 10% Bzophn | 28 si | 13 [PO/NTR] | 1 | PO |
| 24 | PHN, 30% PICOTEX LC, 10% Bzophn | 33 | 68 s, [CF] | 2754 | PO |
| 25 | PHN, 32% PICOTEX LC, 5% Bzophn | 25 | 97 [CF] | 1171 | PO |
| 26 | PHN, 33% PICOTEX LC, 1% Bzophn | 25 | 76 [CF] | 2 | CF |
| 27 | PHN, 30% WINGTACK+, 10% Bzophn | 25 si | 23 [PO] | 765 | PO |
| 28 | PHN, 32% WINGTACK+, 5% Bzophn | 25 i | 12 [PO] | — | |
| 29 | PHN, 33% WINGTACK+, 1% Bzophn | 23 i | 18 [PO1 | — | |
| 30 | PHN, 32% PICCOLYTE A135, 5% Bzophn | 25 | 51 s, [CF] | 5257 | CF |
| 31 | PHN, 32% PICOTEX LC, Bzophn | 25 | 111 [CF] | 475 | CF |

Abbreviations: s = raspy peel, si = slightly immiscible, i = immiscible, PO = pop off, AT = adhesive transfer, CF = cohesive failure, NTR = nontacky residue, Bzophn = benzophenone, MPBT = 2,4-bis(trichloromethyl)-6-(3'-methoxyphenyl)-sym-triazine (manufactured by Minnesota Mining and Manufacturing Co., St. Paul, MN). EASTOTAC H100R is available from Eastman Chemical Co., Kingsport, TN. REGALRITE 355 is available from Hercules Corp., Wilmington, DE.
The data of Table 1 demonstrate the ability of a poly(β-hydroxyorganoate) such as PHN to perform as a pressure sensitive adhesive. The polymer alone exhibited minimal PSA properties in the peel adhesion and static shear tests. The polymer can be tackified to increase the peel adhesion and can be crosslinked to increase the time under which a load will be held in shear. The crosslinking experiments, which are described in this table, were done in static air.
The most effective adhesives were formed when the polymer was crosslinked and tackified. The peel and shear values can be fine-tuned depending on the type of tackifier and degree of crosslinking that is required for a new PSA tape. The tackifier resins found to be the most effective were those of the general class of rosin esters or aromatic materials such as the FORAL 85, GP 2103, and PICOTEX resins. A variety of crosslinking agents that are able to initiate free radicals are effective at crosslinking the polymers of the invention.

TABLE 2

| Ex # | Composition | Coating thickness (μm) | 180° peel from (glass) (N/dm) | Static shear (min) | MOF in shear |
|---|---|---|---|---|---|
| 32 | PHO, 35% FORAL 85, 9% Bzophn | 23 | 59 s | 766 | CF |
| 33 | PHO, 30% PICCOLYTE A135, 9% Bzophn | 25 | 13 s | — | |
| 34 | PHO, 32% PICCOLYTE A135, 5% Bzophn | 25 si | 2 [PO] | — | |
| 35 | PHO, 35% PICCOLYTE A135, 0.15% MPBT | 23 si | 18 s | 1925 | CF |
| 36 | PHO, 32% WINGTACK+, 5% Bzophn | 25 i | 19 [NTR] | — | |
| 37 | PHO, 35% WINGTACK+, 0.15% MPBT | 28 i | 14 [NTR] | — | |

Abbreviations: s = raspy peel, si = slightly immiscible, i = immiscible, PO = pop off, CF = cohesive failure, NTR = nontacky residue, Bzophn = benzophenone, MPBT = 2,4-bis(trichloromethyl)-6-(3'-methoxyphenyl)-sym-triazine (manufactured by Minnesota Mining and Manufacturing Co., St. Paul, MN).
The data of Table 2 are for PHO as a pressure sensitive adhesive. This polymer was found to exhibit the properties of a PSA to a lesser degree than for PHN.

TABLE 3

| Ex # | Composition | Coating thickness (μm) | 180° Peel from (glass) (N/dm) | Static shear (min) | MOF in shear |
|---|---|---|---|---|---|
| 38 | PHO/N | 25 | 1 | 10,000+ | |
| 39 | PHO/N, 32% GP 2103, 5% Bzophn | 25 | 80 s, [CF] | 6 | CF |
| 40 | PHO/N, 32% FORAL 85, 5% Bzophn | 25 | 112 s, [CF] | 10,000+ | |
| 41 | PHO/N, 32% PICOTEX LC, 5% Bzophn | 30 | 97 s, [CF] | 8595 | PO |
| 42 | PHO/N, 10% FORAL 85, 5% Bzophn | 25 | 32 | 756 | CF |
| 43 | PHO/N, 20% FORAL 85, 5% Bzophn | 25 | 72 [CF] | 1285 | PO |
| 44 | PHO/N, 30% FORAL 85, 5% Bwphn | 28 | 102 [CF] | 3319 | PO |
| 45 | PHO/N, 30% FORAL 85, 5% Bzophn | 25 | 73 | — | |
| 46 | PHO/N, 40% FORAL 85, 5% Bzophn | 25 | 99 s, [CF] | >10,000 | |
| 47 | PHO/N, 40% FORAL 85, 5% Bzophn | 23 | 117 [CF] | — | |
| 48 | PHO/N, 50% FORAL 85, 5% Bzophn | 25 | 97 s, [CF] | 123.5 | CF |
| 49 | PHO/N, 60% FORAL 85, 5% Bzophn | 33 | 8 [CF] | 853 | CF |
| 50 | PHO/N, 80% FORAL 85, 5% Bzophn | 28 | 1 [NTR] | 1 | |
| 51 | PHO/N, 55% FORAL 85, 5% Bzophn | 30 | 72 [CF] | — | — |
| 52 | PHO/N, 20% PICOTEX LC, 5% Bzophn | 25 | 81 | 53.5 | PO |
| 53 | PHO/N, 30% PICOTEX LC, 5% Bzophn | 28 | 112 [CF] | 2844 | PO |
| 54 | PHO/N, 40% PICOTEX LC, 5% Bzophn | 25 | 147 [CF] | 10,000+ | |
| 55 | PHO/N, 60% PICOTEX LC, 5% Bzophn | 28 | 16 s, [CF] | 457 | CF |
| 56 | PHO/N, 80% PICOTEX LC, 5% Bzophn | 30 | 1 [NTR] | 1 | |
| 57 | PHO/N, 50% PICOTEX LC, 5% Bzophn | 25 | 74 s, [CF] | 2 | |
| 58 | PHO/N, 45% PICOTEX LC, 5% Bzophn | 23 | 72 s, [CF] | 10,000+ | |
| 59 | PHO/N, 55% PICOTEX LC, 5% Bzophn | 30 | 16 s, [CF] | 224 | CF |
| 60 | PHO/N, 35% FORAL 85, 9% Bzophn | 28 | 66 s | 2075 | PO/NTR |
| 61 | PHO/N, 30% PICCOLYTE A135, 9% Bzophn | 28 | 11 s | 10,000+ | |
| 62 | PHO/N, 32% PICCOLYTE A135, 5% Bzophn | 20 | 54 s, [CF] | 2620 | CF |
| 63 | PHO/N, 35% PICCOLYTE A135, 0.15% MPBT | 18 | 79 s | 10,000+ | |
| 64 | PHO/N, 32% WINGTACK+, 5% Bzophn | 20 i | 3 [PO] | — | |
| 65 | PHO/N, 32% PICOTEX LC, 5% Bzophn | 20 | 89 [CF] | 6060 | CF |

Abbreviations: s = raspy peel, si = slightly immiscible, i = immiscible, PO = pop off, CF = cohesive failure, NTR = nontacky residue, Bzophn = benzophenone.

The data of Table 3 show the utility of PHO/N as a PSA. High performance PSAs were obtained when the tackified polymer was crosslinked, although PHO/N alone showed properties of a PSA. The tackifiers which provided a range of peels and remained compatible with the polymer were of the general classes of rosin acid esters and aromatic resins. A range of compositions using two tackifiers was developed, using PICOTEX LC and FORAL 85. The examples showed a change in peel values with change in tackifier concentration. In general, PHO/N performed extremely well as a PSA. The crosslinking experiments which are described in this table were done in static air.

TABLE 4

| Ex # | Composition | Coating thickness (μm) | 180° peel from (glass) (N/dm) | Static shear (min) | MOF in shear |
|---|---|---|---|---|---|
| 66 | PHO/U | 13 | 1 | 10,000+ | |
| 67 | PHO/U[1], 35% FORAL 85, 9% Bzophn | 23 | 63 s | 2184 | PO/NTR |
| 68 | PHO/U[1], 32% FORAL 85, 5% Bzophn | 18 | 65 s | 10,000+ | |
| 69 | PHO/U[1], 35% FORAL 85, 1% Bzophn | 20 | 86 s | 10,000+ | |
| 70 | PHO/U[1], 35% PICCOLYTE A135, 1% Bzophn | 25 | 26 s | 10,000+ | |
| 71 | PHO/U[1], 35% PICCOLYTE A135, 0.15% MPBT | 23 si | 4 s | 10,000+ | |
| 72 | PHO/U[1], 35% FORAL AX, 1% Bzophn | 23 | 74 [CF] | 7 | CF |
| 73 | PHO/U[1], 35% FORAL AX, 0.15% MPBT | 23 si | 62 [CF] | 16 | CF |
| 74 | PHO/U[1], 32% PICOTEX, 5% Bzophn | 23 | 71 | 273 | CF/NTR |
| 75 | PHO/U[1], 30% PICOTEX LC, 5% Bzophn | 25 | 89 | | |
| 76 | PHO/U[1], 35% PICOTEX LC, 1% Bzophn | 25 si | 82 | 10,000+ | |
| 77 | PHO/U[1], 35% GP 2103, 1% Bzophn | 20 | 99 s, [CF] | 44 | CF |
| 78 | PHO/U[1], 32% FORAL 85, 5% Bzophn | 28 | 52 s | 10,000+ | |
| 79 | PHO/U[1], 32% FORAL 85, 1% Bzophn | 28 | 105 | 10,000+ | |
| 80 | PHO/U[2], 10% FORAL 85, 5% Bzophn | 28 | 4 | — | |
| 81 | PHO/U[2], 50% FORAL 85, 5% Bzophn | 30 | 1 s | — | |
| 82 | PHO/U[2], 20% PICOTEX LC, 5% Bzophn | 28 | 5 | — | |
| 83 | PHO/U[2], 30% PICOTEX LC, 5% Bzophn | 25 | 2 s | — | |
| 84 | PHO/U[2], 40% PICOTEX LC, 5% Bzophn | 25 | 1 s | — | |
| 85 | PHO/U[2], 20% FORAL 85, 5% Bzophn | 28 | 12 s | 367 | PO |
| 86 | PHO/U[2], 30% FORAL 85, 5% Bzophn | 28 | 7 s | 21 | CF |
| 87 | PHO/U[2], 40% FORAL 85, 5% Bzophn | 25 | 2 s | 2290 | CF |
| 88 | PHO/U[2], 20% PICOTEX LC, 5% Bzophn | 28 | 23 | 91 | PO |
| 89 | PHO/U[2], 30% PICOTEX LC, 5% Bzophn | 23 | 4 s | 431 | PO |
| 90 | PHO/U[2], 40% PICOTEX LC, 5% Bzophn | 23 | 2 s | 2400+ | |

Abbreviations: s = raspy peel, si = slightly immiscible, i = immiscible, PO = pop off, CF = cohesive failure, NTR = nontacky residue, Bzophn = benzophenone, MPBT = 2,4-bis(trichloromethyl)-6-(3'-methoxyphenyl)-sym-triazine (manufactured by Minnesota Mining and Manufacturing Co., St. Paul, MN).

TABLE 4-continued

| Ex # | Composition | Coating thickness (μm) | 180° peel from (glass) (N/dm) | Static shear (min) | MOF in shear |
|------|-------------|------------------------|-------------------------------|--------------------|--------------|

The data of Table 3 show the utility of PHO/U as a PSA. High performance PSAs were obtained when the tackified polymer was crosslinked, although PHO/U alone showed properties of a PSA. The tackifiers which provided a range of peels and remained compatible with the polymer were of the general classes of rosin acid esters and aromatic resins. A range of compositions using two tackifiers was developed, using PICOTEX LC and FORAL 85. The examples showed a change in peel values with change in tackifier concentration. The tackified, crosslinked polymer PHO/U[1], containing side chains having 7–9 mole-% unsaturation performed well as a PSA; however, PHO/U[2] which contained 12–16 mole-% unsaturation in the side chains and provided only adhesives having lower peel adhesion. The crosslinking experiments which are described in this table were done in static air.

TABLE 5

| Example # | Composition | Coating wt. thickness (μm) | % Gel |
|-----------|-------------|----------------------------|-------|
| 91 | PHO/U, 10% Bzophn | 24 | 80.88 |
| 92 | PHO/U, 5% Bzophn | 23 | 81.40 |
| 93 | PHO/U, 1% Bzophn | 28 | 41.90 |
| 94 | PHN, 10% Bzophn | 26 | 72.11 |
| 95 | PHN, 5% Bzophn | 25 | 73.06 |
| 96 | PHN, 1% Bzophn | 26 | 48.71 |

Abbreviations: Bzophn = benzophenone.

A set of examples of polymer and photoinitiator was prepared to carry out gel content experiments. A perusal of the data in Table 5 showed that an increase in concentration of initiator content increased the gel content.

TABLE 6

| Example # | 180° Peel (glass) | Aging Time (days) 25° C. |
|-----------|-------------------|--------------------------|
| 40 | 104 | 25 |
| 41 | 90 | 25 |
| 78 | 49s | 25 |
| 79 | 97 | 25 |
| 31 | 102 | 25 |
| 30 | 48 | 25 |
| 74 | 27s | 150 |
| 62 | 32s [CF] | 150 |
| 10 | 120 [CF] | 180 |
| 14 | 68 [CF] | 180 |
| 19 | 98 [NTR] | 180 |
| 13 | 118 [CF] | 180 |
| 18 | 83 [CF] | 195 |
| 15 | 63 [CF] | 195 |
| 67 | 55 | 245 |
| 32 | 89s, [CF] | 245 |
| 60 | 26s [CF] | 245 |

Abbreviations: CF = cohesive failure

The peel adhesion values after aging at room temperature for a specified period of time of some of the Examples from Tables 1–4 are listed here. As can be seen in the data, the peel adhesion of the PSAs were maintained with time, a vital characteristic of a PSA. This data also indicates that the adhesives remain tacky for the aging time shown. Consequently, an open time greater than the aging time was maintained.

While this invention has been described in connection with specific embodiments, it should be understood that it is capable of further modification. The claims herein are intended to cover those variations which one skilled in the art would recognize as the chemical equivalent of what has been described herein. Thus, various omissions, modifications, and changes to the principles described herein may be made by one skilled in the art without departing from the true scope and spirit of the invention which is indicated by the following claims.

What is claimed is:

1. A pressure sensitive adhesive comprising a crosslinked poly($\beta$-hydroxyorganoate) and a tackifier; wherein the pressure sensitive adhesive has a Tg of less than about 20° C. and the poly($\beta$-hydroxyorganoate) comprises monomeric units of the general formula:

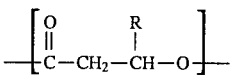

wherein:

(i) a minor amount of the monomeric units have an R group containing 1–3 carbon atoms; and (ii) a major amount of the monomeric units have an R group containing 4–30 carbon atoms.

2. The pressure sensitive adhesive of claim 1 wherein the poly($\beta$-hydroxyorganoate) comprises no greater than about 20 mole percent of the monomeric units having an R group containing 1–3 carbon atoms, and at least about 80 mole percent of the monomeric units having an R group containing 4–30 carbon atoms.

3. The pressure sensitive adhesive of claim 1 comprising a mixture of different poly($\beta$-hydroxyorganoate)s.

4. The pressure sensitive adhesive of claim 1 wherein the poly($\beta$-hydroxyorganoate) comprises a major amount of at least two different monomeric units having R groups containing 4–30 carbon atoms.

5. The pressure sensitive adhesive composition of claim 1 wherein the poly($\beta$-hydroxyorganoate) has unsaturated R groups.

6. The pressure sensitive adhesive composition of claim 1 wherein the poly($\beta$-hydroxyorganoate) comprises a major amount of 3-hydroxyoctanoate and 3-hydroxynonanoate monomeric units.

7. The pressure sensitive adhesive composition of claim 1 wherein the poly($\beta$-hydroxyorganoate) comprises a major amount of 3-hydroxyoctanoate and 3-hydroxy-10-undecenoate monomeric units.

8. A nonplasticized pressure sensitive adhesive comprising a crosslinked poly($\beta$-hydroxyorganoate) and a tackifier; wherein the pressure sensitive adhesive has a Tg of less than about 20° C. and the poly($\beta$-hydroxyorganoate) comprises nonomeric units of the general formula:

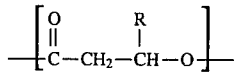

wherein:

(i) a minor amount of the monomeric units have an R group containing 1–3 carbon atoms; and (ii) a major amount of the monomeric units have an R group containing 4–30 carbon atoms.

9. The pressure sensitive adhesive of claim 8 wherein the poly(β-hydroxyorganoate) comprises no greater than about 20 mole percent of the monomeric units having an R group containing 1–3 carbon atoms, and at least about 80 mole percent of the monomeric units having an R group containing 4–30 carbon atoms.

10. The pressure sensitive adhesive of claim 8 comprising a mixture of different poly(β-hydroxyorganoate)s.

11. The pressure sensitive adhesive of claim 8 wherein the poly(β-hydroxyorganoate) comprises a major amount of at least two different monomeric units having R groups containing 4–30 carbon atoms.

12. The pressure sensitive adhesive composition of claim 8 wherein the poly(β-hydroxyorganoate) has unsaturated R groups.

13. The pressure sensitive adhesive composition of claim 8 wherein the poly(β-hydroxyorganoate) comprises a major amount of 3-hydroxyoctanoate and 3-hydroxynonanoate monomeric units.

14. The pressure sensitive adhesive composition of claim 8 wherein the poly(β-hydroxyorganoate) comprises a major amount of 3-hydroxyoctanoate and 3-hydroxy-10-undecenoate monomeric units.

15. A pressure sensitive adhesive composition comprising:
   (a) a poly(β-hydroxyorganoate) comprising monomeric units of the general formula:

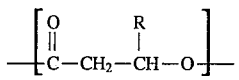

wherein:
   (i) a minor amount of the monomeric units have an R group containing 1–3 carbon atoms; and
   (ii) a major amount of the monomeric units have an R group containing 4–30 carbon atoms;
   (b) a tackifier; and
   (c) a crosslinking agent.

16. The pressure sensitive adhesive composition of claim 15 wherein the poly(β-hydroxyorganoate) comprises no greater than about 20 mole percent of the monomeric units having an R group containing 1–3 carbon atoms, and at least about 80 mole percent of the monomeric units having an R group containing 4–30 carbon atoms.

17. The pressure sensitive adhesive composition of claim 15 wherein the poly(β-hydroxyorganoate) has unsaturated R groups.

18. The pressure sensitive adhesive composition of claim 17 wherein the poly(β-hydroxyorganoate) has no greater than about 20 mole percent monomeric units having unsaturation therein.

19. The pressure sensitive adhesive composition of claim 15 wherein the poly(β-hydroxyorganoate) comprises a major amount of at least two different monomeric units having R groups containing 4–30 carbon atoms.

20. The pressure sensitive adhesive composition of claim 19 wherein the poly(β-hydroxyorganoate) comprises a major amount of 3-hydroxyoctanoate and 3-hydroxynonanoate monomeric units.

21. The pressure sensitive adhesive composition of claim 19 wherein the poly(β-hydroxyorganoate) comprises a major amount of 3-hydroxyoctanoate and 3-hydroxy-10-undecenoate monomeric units.

22. The pressure sensitive adhesive composition of claim 15 wherein the poly(β-hydroxyorganoate) comprises a major amount of 3-hydroxyoctanoate.

23. The pressure sensitive adhesive composition of claim 15 wherein the poly(β-hydroxyorganoate) comprises a major amount of 3-hydroxynonanoate.

24. The pressure sensitive adhesive composition of claim 15 wherein the tackifier is selected from the group consisting of a rosin, a rosin derivative, a resin derived by polymerization of $C_{5-9}$ unsaturated hydrocarbon monomers, and a phenol-containing resin.

25. The pressure sensitive adhesive composition of claim 15 wherein the crosslinking agent is selected from the group consisting of a radiation crosslinker, a chemical crosslinker, a photoinitiator, a thermal initiator, and a sensitizer.

26. The pressure sensitive adhesive composition of claim 25 wherein the crosslinking agent is a photoinitiator.

27. The pressure sensitive adhesive of claim 1 wherein the pressure sensitive adhesive is biodegradable.

28. The nonplasticized pressure sensitive adhesive of claim 8 wherein the pressure sensitive adhesive is biodegradable.

29. A pressure sensitive adhesive preparable by combining components comprising:
   (a) a poly(β-hydroxyorganoate) comprising monomeric units of the general formula:

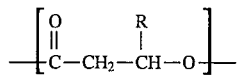

wherein:
   (i) a minor amount of the monomeric units have an R group containing 1–3 carbon atoms; and
   (ii) a major amount of the monomeric units have an R group containing 4–30 carbon atoms;
   (b) a tackifier; and
   (c) a crosslinking agent.

* * * * *